March 18, 1941.  A. RONNING  2,235,041
MANUALLY PROPELLED VEHICLE
Filed May 21, 1938  2 Sheets-Sheet 1
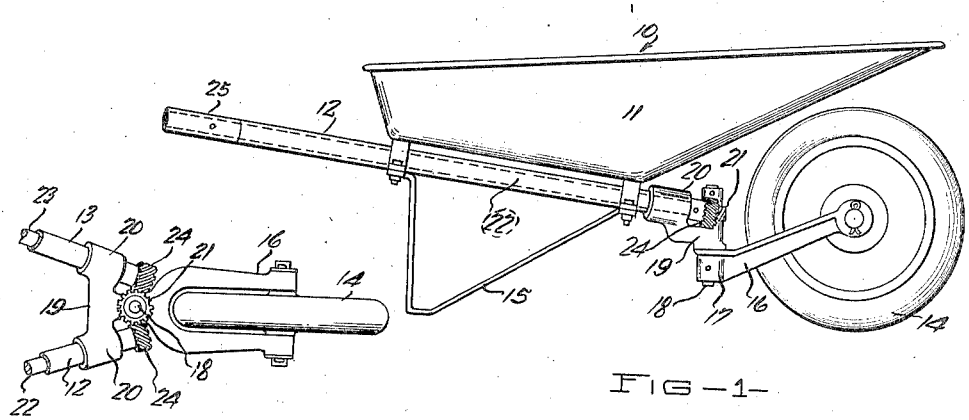
FIG-1-
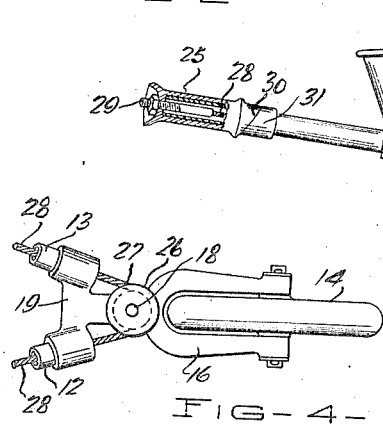
FIG-2-
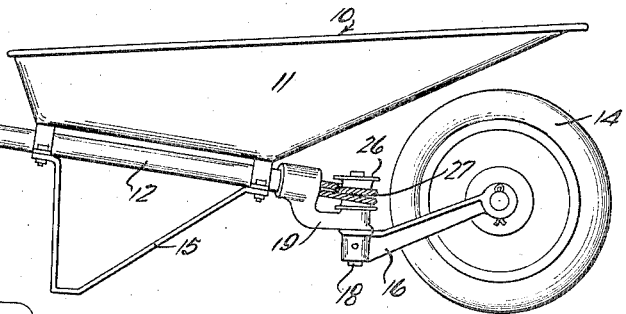
FIG-3-
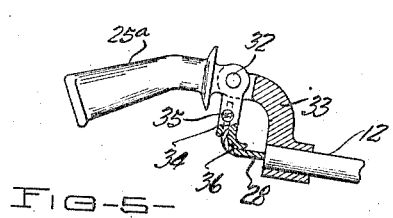
FIG-4-
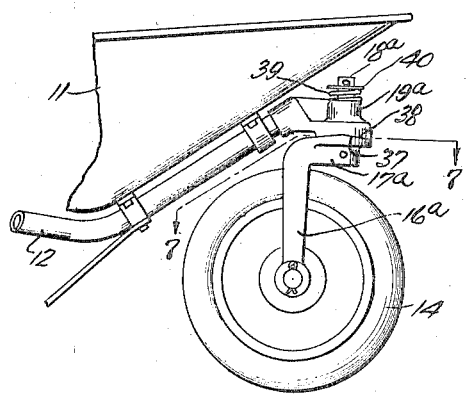
FIG-6-
FIG-5-
FIG-7-
INVENTOR
ADOLPH RONNING
BY
*Andrew E. Carlsen*
ATTORNEY

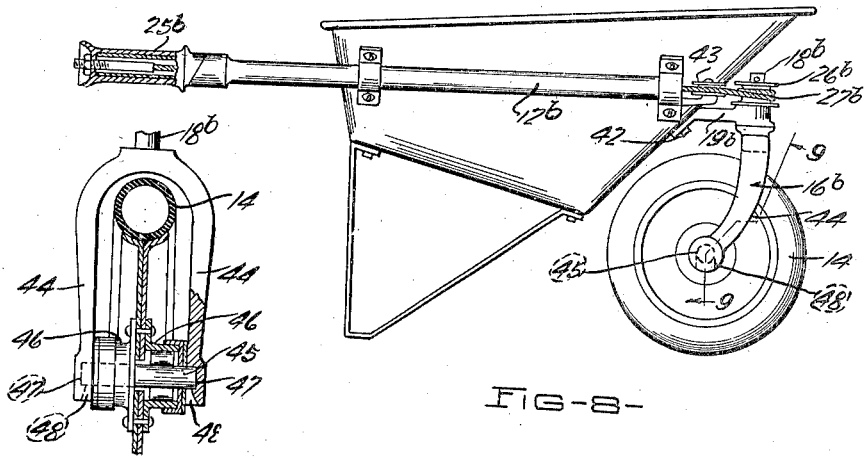
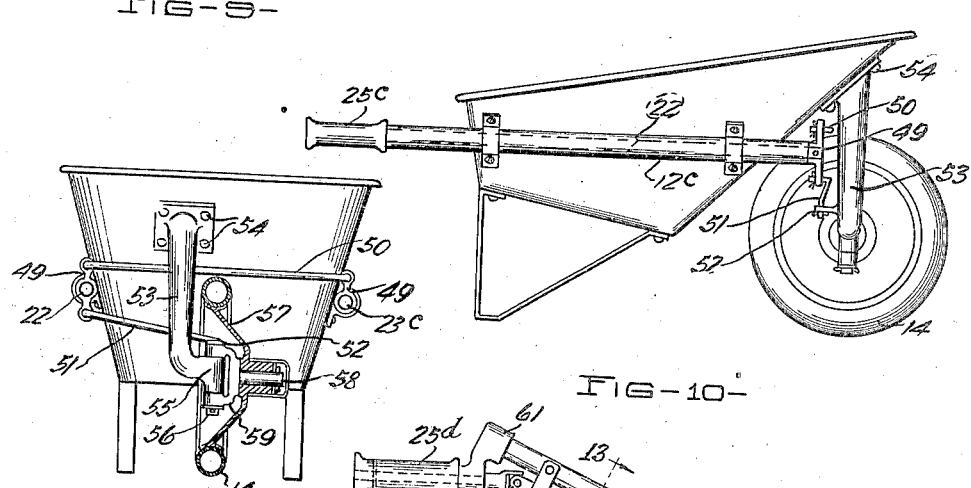
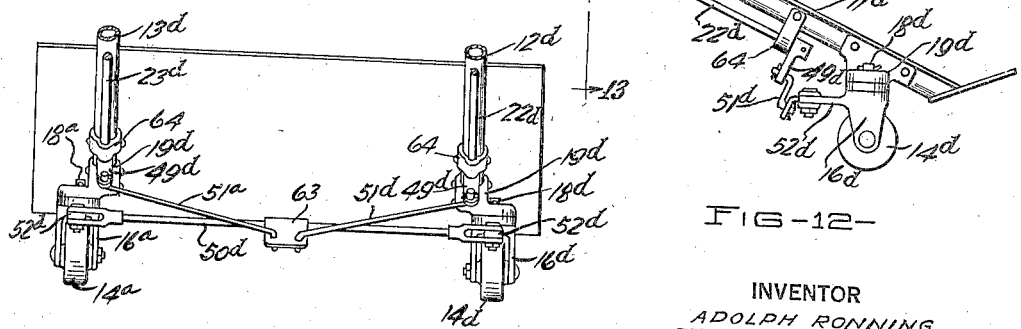

Patented Mar. 18, 1941

2,235,041

UNITED STATES PATENT OFFICE 2,235,041

MANUALLY PROPELLED VEHICLE

Adolph Ronning, Minneapolis, Minn.

Application May 21, 1938, Serial No. 209,283

11 Claims. (Cl. 280—43)

This invention relates generally to improvements in that class of relatively small, hand operated wheeled trucks which includes wheelbarrows, handcarts, and other vehicles used for transporting goods and materials of various kinds.

Trucks or vehicles of this kind generally are not provided with means for steering their supporting wheel, or wheels, and in making a turn it is therefore necessary for the operator to swing the vehicle around by means of its handle, or handles, so that it is headed in the desired direction. Such action requires a considerable number of extra steps by the operator and also prevents the making of a turn in restricted space since a considerable amount of room is needed for this swinging action of the vehicle.

It is the primary object of my invention, therefore, to provide means whereby hand operated trucks or transport vehicles of this kind may be steered in order to make turns without lateral swinging movement of the vehicle, and to thus greatly facilitate the use and operation of such devices and to enable them to be used and turned in relatively restricted spaces.

Another object is to provide steering means for hand operated vehicles of this kind in which the steering control is arranged as a part of the handles used for lifting and manipulating the vehicle so that the steering operation may be carried out conveniently and without requiring that the operator shift his hands from their normal positions on the handles.

Another object is to provide a steering mechanism for a hand operated wheel supported transport vehicle including handles for manipulating the vehicle, and hand grips rotatably arranged on the handles in position for convenient operation by the hands as they manipulate the vehicle, and the said hand grips having connection to a dirigible wheel, or wheels, of the vehicle in such manner that rotation of the hand grips will result in an oscillation of the wheel, or wheels, in a horizontal plane to thereby steer and guide the vehicle in any desired direction.

Another object is to provide a steering mechanism for a vehicle having a dirigible wheel, or wheels, and handles extended in position for manipulating by the operator to lift and move the vehicle, and the said steering mechanism, including movable means associated with the handles and normally effective to serve as hand grips by which the vehicle may be lifted and moved but arranged in such manner that movement of the hand grips will control the direction of the wheel, or wheels, supporting the vehicle for steering purposes.

Another object is to provide a steering mechanism for a wheel supported and hand operated vehicle which includes a dirigible wheel, or wheels, and a handle by means of which the vehicle may be moved, and which steering mechanism includes means whereby rotation or oscillation of the handle on its axis will be effective to steer or guide the dirigible wheel, or wheels, and control the direction of the vehicle.

Another object is to provide a steering mechanism for a dirigible wheel, or wheels, of a vehicle, which may be operated from a remote point and which includes gear, cable or lever actuated means for oscillating the wheel, or wheels, about a vertical axis to thereby control the direction of the vehicle.

A further object is to provide an improved dirigible wheel assembly for vehicles of this kind in which the wheel itself is journaled in a supporting fork and is releasably retained therein in such manner that it may be removed and replaced at any time without loosening any screws or bolts of any kind and can, in fact, be at least replaced in the fork without the use of any tools whatsoever.

A further object is to provide an improved dirigible wheel assembly for vehicles of this kind in which the vertical axis on which the wheel oscillates for steering purposes is arranged in the same plane as the axis on which the wheel rotates to thus prevent the setting up of lateral or twisting stresses such as would have a tendency to resist oscillation of the wheel in steering and to otherwise interfere with the operation.

The foregoing and other objects, together with means whereby the same may be carried into effect, will best be understood from the following detailed description of my invention, reference being had to the accompanying drawings, wherein:

Fig. 1 is a side elevation of a wheelbarrow having a dirigible wheel and gear actuated means for steering the wheel responsive to rotation of hand grips arranged at the ends of the handles.

Fig. 2 is a fragmental plan view of the frontal portion of the wheelbarrow showing the wheel and steering means therefor.

Fig. 3 is a view similar to Fig. 1, but showing a cable actuated steering means for the wheel.

Fig. 4 is a view similar to Fig. 2, but again showing the cable actuated steering means.

Fig. 5 is a fragmental sectional detail view showing a modified arrangement of the hand grips or members for controlling the steering action of the wheels in connection with the cable actuated steering means therefor.

Fig. 6 is a fragmental side elevation of the frontal portion of a wheelbarrow showing a dirigible wheel mounting with cam acting means for normally retaining the wheel in straight ahead position.

Fig. 7 is a view along the line 7—7 in Fig. 6.

Fig. 8 is a side elevation of a wheelbarrow, showing cable operation of the dirigible wheel and showing an improved wheel mounting assembly.

Fig. 9 is an enlarged radial section along the line 9—9 in Fig. 8.

Fig. 10 is a side elevation of a wheelbarrow showing direct lever operation of the dirigible wheel and also disclosing an advantageous mounting means and assembly for the wheel.

Fig. 11 is a frontal elevation of the assembly of Fig. 10, but showing the wheel in vertical and diametrical cross section to better disclose the mounting therefor.

Fig. 12 is a side elevation of a two wheeled type of hand truck showing means for steering the wheels thereof by manipulation of the handles by which the truck is lifted and moved.

Fig. 13 is a transverse section along the line 13—13 in Fig. 12.

Referring now more particularly to Figs. 1 and 2 of the drawings, the reference numeral 10 generally designates a wheelbarrow including the receptacle or body 11, the forwardly converging handles 12 and 13, the supporting wheel 14 and the legs or stand structure 15. These parts are arranged in substantially the usual manner so that the handles 12 and 13 project rearwardly to serve as means whereby the device may be picked up and balanced on the wheel 14 and rolled from place to place on the wheel. In accordance with my invention, however, the wheel 14 is dirigibly mounted by means of a fork 16 which extends rearwardly and has its bight 17 apertured so that it may be rigidly secured to the lower end of a vertically axised steering shaft or king pin 18. This pin 18 is journaled through a casting or mounting member 19 which has tubular members 20 for receiving the frontal ends of the handles 12 and 13, and wherein the said handles are secured by any suitable means. A gear 21 is secured to the upper end of the pin 18 above the casting member 19.

The handles 12 and 13 are of tubular construction, and thus provide passageways through which steering shafts 22 and 23 may be rotatably mounted so that they extend at each end from the handles. At their frontal ends the steering shafts 22 and 23 carry rigidly mounted pinions 24 which are placed in mesh with the gear 21, while at their rear ends the shafts are provided with tubular hand grips or grip members 25 which are rigidly pinned on the shafts and extend from the rear ends of the handles 12 and 13.

In use the wheelbarrow is operated in the usual manner by placing the hands on the grip members 25 and lifting the barrow upwardly so that it may be moved forwardly on the wheel 14. When, however, it is desired to make a turn in either direction the grip members 25 are turned on their axes, causing a rotation of the steering shafts 22 and 23 and corresponding movement of the pinions 24. This action rotates the gear 21 and the pin 18 and oscillates the fork 16 in a horizontal plane so that the direction of the wheel 14 is varied to thereby steer the wheelbarrow in the desired direction. This action may be carried out very conveniently inasmuch as it requires no change in position of the operator's hands except simply the slight twist of the wrists necessary to partially rotate the various steering parts, as will be understood. Both grip members 25 are preferably arranged to turn in the same direction in the steering operation, since this is the more normal and convenient action, but it is, of course, understood that they may be adapted to turn in opposite directions if so desired.

In Figs. 3 and 4 the wheelbarrow 10, body portion 11, handles 12, and 13, and stand 15 are exactly as heretofore described and likewise the wheel 14 has its fork 16 affixed to a steering pin 18 which is carried in the casting member 19 at the frontal ends of the handles. In this case, however, the geared connections and steering mechanisms are replaced by cable actuated or driven steering means and, in lieu of the gear 21, a pulley or sheave 26 is affixed to the upper end of the pin 18, and a cable 27 is wrapped therearound, as shown. The ends 28 of the cable 27 are passed rearwardly through the tubular handles 12 and 13, and are secured by the tension adjusting bolts 29 to the rear ends of the grip members 25. These members 25 are journaled on the rear end portions of the handles 12 and 13, and have their frontal ends cut off obliquely, or at an angle to their axes, to provide cam acting surfaces 30 which bear against, and cooperate with, similiarly cut ends of cam collars 31 which are secured to the handles.

The foregoing arrangement is such that rotation of the grip members 25 will exert a pull on the cable 27 and cause a rotation of the sheave 26 and move the wheel 14 in a horizontal plane to thereby steer the wheelbarrow. The grip members 25 here again serve also as the means for normally lifting and manipulating the wheelbarrow, as hereinbefore described.

In Fig. 5 a pivotally mounted form of grip member is disclosed, and comprises the suitably formed and shaped member 25a having its shank pivotally mounted at 32 on a bracket 33 which is secured to the rear end of the handle 12 or 13. A crank lever or finger 34 is extended from the shank of the grip member 25a, and the cable end 28 is secured at 35 to this lever so that an upward movement of the member will result in a pull on the cable to steer the wheelbarrow. This upward movement of either of the members 25a (one is, of course, used on each side of the wheelbarrow) may be readily carried out by a slight forward movement of the wrist on the side toward which it is desired to turn. The ends of the levers 34 are rounded as at 36, where they contact the cable ends 18, to prevent wear on the cables.

Figs. 6 and 7 disclose an improved wheel mounting in which the wheel fork 16ᵃ has its bight portion 17ᵃ provided on its upper side with a cam acting face 37 which cooperates with a similar cam actinging face 38 provided at the underside of the bracket or casting member 19ᵃ. This casting member is secured at the frontal ends of the handles 12 and 13 carrying the body member 11 but, in this case, the handles are turned upwardly at their frontal ends in such manner that the casting member may be supported over the wheel 14. The king pin 18ᵃ extends through the casting member, and an expansion coil spring 39 is braced between the member and a collar 40 fixed on the pin.

The cam acting faces are obliquely and oppositely cut to slope forwardly and rearwardly from the radial lines 41 which are extended transversely with respect to the normal straight ahead line of travel of the wheelbarrow. As a result, the cam faces normally retain the wheel 14 in its normal straightaway position, and resist movement of the wheel to either side. However, the wheel may be so turned, by any steering means desired, and the spring 39 will allow the pin 18$^a$ to yieldably move downward as required by this action; and the spring, coacting with the cam surfaces, will then have a tendency at all times to return the wheel to normal position after the turn has been made.

As shown in Figs. 8 and 9, I provide an assembly wherein the wheelbarrow 10 has cable actuated steering means quite similar to that shown in Figs. 3 and 4, and which includes the sheave 26$^b$ secured atop the shaft 18$^b$ and carrying the cable 27$^b$, which has its ends affixed to the grip members 25$^b$ arranged, as described, so that rotation of these members on the handles 12$^b$ will oscillate the wheel 14 and fork 16$^b$ to steer the wheelbarrow. The casting member 19$^b$ is secured at 42 to the frontal side of the wheelbarrow body, and the handles 12$^b$ (the handle corresponding to 13 not appearing) are extended alongside the same member, instead of beneath the same as previously shown, so that idler sheaves 43 are necessarily provided near the frontal ends of the handles to properly guide the cable 27$^b$.

The fork 16$^b$ is made of malleable material so that its spaced arms 44 may have a slight degree of resiliency sufficient to permit them to be spread apart at their ends and ensuring that they will return to their normal spacing when released. This is of advantage in that it permits a readily removable type of wheel mounting now to be described. The wheel 14 has the transversely extended axle 45 on which the hub of the wheel is journaled by roller bearings 46. The inner sides of the fork arms 44 have inwardly opening sockets or receptacles 47 formed near their lower ends, and from these sockets to their lower extremities the arms are grooved and beveled off outwardly and downwardly as indicated at 48. The length of the axle 45 is such that it will just span the arms 44 and rest at its ends in the sockets 47 as clearly shown in Fig. 9. However, by slightly spreading the arms 44 apart at their free ends the axle may drop from the sockets and the wheel 14 may then be removed very readily. In fact, the only tool necessary for this operation would be a screw driver, which could be used as a pry working against the arms 44 and, of course, there would be no loose parts to be mislaid while changing a wheel. When replacing the wheel the axle may be pressed at its ends against the beveled faces 48 of the arms 44, to thereby spread the arms so that the axle may slip into the sockets 47.

In Figs. 10 and 11 I have disclosed another form of steering apparatus in which the rotatable hand grips 25$^c$ at the ends of the handles 12$^c$ (the opposite handle corresponding to handle 13 not being shown) actuate steering shafts 22$^c$ and 23$^c$ extending through the handles and carrying crank arms 49 at their frontal ends, forwardly of the body of the wheelbarrow. One of these crank arms 49 is double ended, and is connected at one end by a cross or radius rod 50 to the other arm 49, and the other end of the double crank arm is connected by the steering link 51 to an extended lever or finger 52, which extends from the wheel 14. Thus, by turning the hand grips 25$^c$, the link 51 will oscillate the wheel 14 to steer the wheelbarrow and, due to the cross connection of the rod 50, the hand grips will operate together and in the same direction.

The wheel mounting here takes the form of a rigid post 53 which is secured at 54 to the frontal portion of the wheelbarrow, and depends downwardly therefrom. A lateral offset 55 of this post receives the king pin or shaft 56, similar to the pin 18 heretofore described, and upon which the wheel 14 oscillates for steering the wheelbarrow. The wheel 14 has its rim or disk 57 laterally extended or cupped and carrying the axle 58 which extends from a fork 59 pivotally mounted on the pin 56. The arrangement of parts is such that the vertical axis of the pin 56, on which the wheel 14 oscillates in the steering action, coincides with the plane on which the wheel rolls or its axis of rotation, as clearly shown. As a result the wheel has no tendency to camber or sway to either side, and the steering operation is thus greatly facilitated.

Another type of small transport vehicle to which my handle controlled steering mechanism is well adapted is the two wheeled truck designated generally at 60, and disclosed in Figs. 12 and 13. Here the truck comprises handles 12$^d$ and 13$^d$, the body 11$^d$ and wheel supporting castings 19$^d$ which play substantially the same parts as they do in the wheelbarrow, hereinbefore described. However, the castings 19$^d$ are two in number, and two wheels 14$^d$ are supported in transversely spaced relation thereon by means of the king or pivot pins 18$^d$. The forks 16$^d$ which carry the wheels 14$^d$ thus swivel on the pins 18$^d$ for steering purposes, and the forks carry the fingers or cranks 52$^d$ extended rearwardly and connected by a cross or tie rod 50$^d$. The hand grip members 25$^d$ are journaled in brackets 61 secured to the rear ends of the handles, and these members are connected by universal joints 62 to the steering shafts 22$^d$ and 23$^d$, which carry the crank arms 49$^d$ at their frontal ends. These arms 49$^d$ are connected by the steering links 51$^d$ to the tie rod 50$^d$ by means of the terminal plate 63 secured to this rod. The steering shafts are shown in Figs. 12 and 13 as suspended in bearing hangers 64 below the handles but, by minor rearrangement, the shafts may be extended through the handles if so desired.

In use, the truck 60 is lifted and operated in usual manner with the hands placed on the hand grip members 25$^d$ for this action. However, by turning these members 25$^d$ the wheels 14$^d$ may be oscillated on their vertical pins 18$^d$ to steer the the truck to either side, as may be desired.

From the foregoing it will be apparent that I have provided very simple and convenient handle actuated steering means for the small hand operated vehicles of the types so universally used. It is to be understood that I may vary from the structures shown in structural details, so long as such variations fall within the scope of the appended claims.

Having thus fully disclosed my invention, what I claim as new and desire to secure by Letters Patent, is:

1. In a wheelbarrow type of vehicle, a dirigible wheel, handles extended rigidly from the vehicle for lifting and propelling the same, hand grip members rotatably mounted on the ends of the handles, steering mechanism for oscillating the wheel in a horizontal plane and thereby steering the vehicle, and movable steering members connected between the hand grip members and the steering mechanism for actuating the latter responsive to movement of the hand grip members.

2. In a hand operated vehicle, a dirigible supporting wheel, handles extended from the vehicle, grip members movably mounted at the ends of the handles for lifting and manipulating the vehicle, a vertically axised pin supporting the wheel for oscillating movement in a horizontal plane, a steering gear affixed to the pin, steering shafts extended from the grip members and movable thereby, and gears connected to the steering shafts and meshed with the steering gear.

3. In a hand operated vehicle, a dirigible supporting wheel, handles extended from the vehicle, grip members movably mounted at the ends of the handles for lifting and manipulating the vehicle, a vertically axised pin supporting the wheel for oscillating movement in a horizontal plane, a steering gear fixed to the pin, steering shafts extended from the grip members and movable thereby, and gears connected to the steering shafts and meshed with the steering gear, the said handles being tubular and the said steering shafts being mounted endwise through the handles.

4. In a hand operated vehicle, a dirigible supporting wheel, handles extended from the vehicle, grip members movably mounted at the ends of the handles for lifting and manipulating the vehicle, a vertically axised pin supporting the wheel for oscillating movement in a horizontal plane, a sheave secured on the pin, a cable trained around the sheave and connected to the grip members, and cam acting means associated with the grip members and handles whereby movement of the said members will exert a pull on the cable for steering the vehicle.

5. In a hand operated vehicle, a dirigible supporting wheel, handles extended from the vehicle, grip members movably mounted at the ends of the handles for lifting and manipulating the vehicle, a vertically axised pin supporting the wheel for oscillating movement in a horizontal plane, a finger extended from the wheel, steering shafts extended from the hand grip members, crank arms secured to the steering shafts, and link members connecting the crank arms to the finger for oscillating the wheel about a vertical axis in response to movement of the grip members on the handles.

6. In a dirigible wheel assembly for a vehicle, a wheel mounting post secured to the vehicle, a lateral offset at the lower end of the post, a pin vertically axised through the said offset, a wheel having its hub laterally offset to accommodate the said lateral offset of the post and pivotally mounted on the said pin in a vertical plane cutting the medial peripheral line of the wheel.

7. A wheelbarrow comprising a dirigible wheel, handles extended rigidly from the wheelbarrow, hand grip members mounted in extended coaxial relation at the ends of the handles and rotatable thereon, a steering mechanism for angling the wheel in a horizontal plane, and connecting means for actuating said steering mechanism in response to rotation of the hand grip members.

8. A hand propelled vehicle comprising a forwardly mounted supporting wheel, handles extended rearwardly from the vehicle, grip members movably mounted on the handles, a vertically axised pin supporting the wheel for dirigible movement in a horizontal plane, a steering gear affixed to the pin, steering shafts secured to the grip members and extending forwardly in converging relation to points adjacent the pin, and gears on the said steering shafts meshed with the steering gear.

9. A hand propelled vehicle comprising a forwardly mounted supporting wheel, a vertically axised king pin supporting the wheel for angling movement in a horizontal plane, handles extended rearwardly in spaced relation from the vehicle, rotatable hand grips on the handles, steering shafts extended forwardly from the hand grips and rotatable thereby, crank arms on the steering shafts, link members connecting the crank arms and wheel for oscillating the wheel in a horizontal plane, and the said king pin being disposed with its axis in alignment with the thread line of the wheel.

10. A hand propelled vehicle comprising a frame supported forwardly by at least one wheel mounted for steering movement about a vertical axis, a pair of handles extending rearwardly from the frame and rigid with respect thereto for supporting and propelling the same, a member mounted on one of said handles for oscillation about the axis thereof, and means operated by the oscillation of said member for steering said wheel.

11. A hand propelled vehicle comprising a frame supported forwardly by at least one wheel mounted for steering movement about a vertical axis, a pair of handles extending rearwardly from the frame and rigid therewith for supporting and propelling the same, members mounted on said handles and oscillatable about separate axes thereon, and means connected with the said members for operation by oscillation thereof to steer the wheel about its said axis.

ADOLPH RONNING.